(12) United States Patent
Yang et al.

(10) Patent No.: US 9,889,437 B2
(45) Date of Patent: *Feb. 13, 2018

(54) ISOMORPHOUSLY SUBSTITUTED CATALYST

(71) Applicant: BASF Corporation, Florham Park, NJ (US)

(72) Inventors: Xiaofan Yang, Highland Park, NJ (US); John K. Hochmuth, Raritan, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,097

(22) Filed: Apr. 15, 2015

(65) Prior Publication Data

US 2016/0303550 A1 Oct. 20, 2016

(51) Int. Cl.
| | |
|---|---|
| *B01J 29/76* | (2006.01) |
| *B01J 29/072* | (2006.01) |
| *B01D 53/86* | (2006.01) |
| *B01D 53/94* | (2006.01) |
| *B01J 37/02* | (2006.01) |

(Continued)

(52) U.S. Cl.
CPC ........ *B01J 29/763* (2013.01); *B01D 53/8628* (2013.01); *B01D 53/9418* (2013.01); *B01J 29/068* (2013.01); *B01J 29/072* (2013.01); *B01J 29/076* (2013.01); *B01J 29/89* (2013.01); *B01J 35/002* (2013.01); *B01J 37/0246* (2013.01); *B01D 2255/20738* (2013.01);

(Continued)

(58) Field of Classification Search
None
See application file for complete search history.

(56) References Cited

U.S. PATENT DOCUMENTS 4,544,538 A 10/1985 Zones
4,707,345 A 11/1987 Lok et al.
(Continued)

FOREIGN PATENT DOCUMENTS

DE 10 2010 055 680 6/2012
WO WO 2008/106519 9/2008
(Continued)

OTHER PUBLICATIONS

Bleken, F., et al., "The Effect of Acid Strength on the Conversion of Methanol to Olefins Over Acidic Microporous Catalysts with the CHA Topology," *Topics in Catalysts*, 2009, pp. 218-228, vol. 52(3).
(Continued)

*Primary Examiner* — Sheng H Davis
(74) *Attorney, Agent, or Firm* — Womble Bond Dickinson (US) LLP

(57) ABSTRACT

Described is a selective catalytic reduction catalyst comprising a zeolitic framework material of silicon and aluminum atoms, wherein a fraction of the silicon atoms are isomorphously substituted with a tetravalent metal. The catalyst can include a promoter metal such that the catalyst effectively promotes the reaction of ammonia with nitrogen oxides to form nitrogen and $H_2O$ selectively over a temperature range of 150 to 650° C. A method for selectively reducing nitrogen oxides and an exhaust gas treatment system are also described.

17 Claims, 8 Drawing Sheets

(51) Int. Cl.
  *B01J 29/068* (2006.01)
  *B01J 29/076* (2006.01)
  *B01J 29/89* (2006.01)
  *B01J 35/00* (2006.01)

(52) U.S. Cl.
  CPC ............. *B01D 2255/20761* (2013.01); *B01D 2255/50* (2013.01); *B01D 2257/404* (2013.01); *B01J 2229/186* (2013.01)

(56) References Cited

U.S. PATENT DOCUMENTS

| | | | |
|---|---|---|---|
| 4,867,954 | A | 9/1989 | Staniulis et al. |
| 4,869,805 | A | 9/1989 | Lok et al. |
| 5,160,717 | A | 11/1992 | Lok et al. |
| 5,271,761 | A | 12/1993 | Skeels et al. |
| 5,474,754 | A * | 12/1995 | Saxton ................ C01B 39/065 423/705 |
| 5,516,497 | A | 5/1996 | Speronello et al. |
| 5,518,708 | A | 5/1996 | Skeels et al. |
| 5,695,736 | A | 12/1997 | Saxton et al. |
| 5,993,764 | A * | 11/1999 | Tabata ................ B01D 53/9418 423/213.5 |
| 6,709,644 | B2 | 3/2004 | Zones et al. |
| 7,029,650 | B1 | 4/2006 | Juttu et al. |
| 7,074,734 | B2 | 7/2006 | Vu et al. |
| 7,601,662 | B2 | 10/2009 | Bull et al. |
| 8,404,203 | B2 | 3/2013 | Bull et al. |
| 8,535,629 | B2 | 9/2013 | Ballinger et al. |
| 9,011,807 | B2 | 4/2015 | Mohanan et al. |
| 9,126,180 | B2 | 9/2015 | Fedeyko et al. |
| 2004/0266607 | A1 | 12/2004 | Zhou et al. |
| 2007/0071666 | A1 | 3/2007 | Larsen et al. |
| 2007/0117737 | A1 | 5/2007 | Artiga Gonzalez et al. |
| 2007/0244000 | A1 * | 10/2007 | Molinier ................ B01J 23/80 502/300 |
| 2008/0045767 | A1 | 2/2008 | Cao et al. |
| 2008/0233031 | A1 | 9/2008 | Yuen et al. |
| 2008/0241034 | A1 * | 10/2008 | Schwefer ............ B01D 53/8628 423/239.2 |
| 2008/0293989 | A1 | 11/2008 | Khanmamedova et al. |
| 2009/0129995 | A1 | 5/2009 | Pfeifer et al. |
| 2009/0214397 | A1 | 8/2009 | Shirono et al. |
| 2010/0187156 | A1 | 7/2010 | Prentice et al. |
| 2011/0130579 | A1 * | 6/2011 | Muller ..................... B01J 29/89 549/518 |
| 2011/0146237 | A1 * | 6/2011 | Adelmann ......... B01D 53/9418 60/274 |
| 2012/0004485 | A1 | 1/2012 | Jan et al. |
| 2012/0010453 | A1 * | 1/2012 | Ohkubo ................ B01J 23/002 585/638 |
| 2012/0039759 | A1 | 2/2012 | Narula et al. |
| 2012/0238792 | A1 * | 9/2012 | Watson .................. B01J 29/126 585/277 |
| 2012/0244066 | A1 | 9/2012 | Bull et al. |
| 2012/0255377 | A1 | 10/2012 | Kamakoti et al. |
| 2012/0258032 | A1 | 10/2012 | Phillips et al. |
| 2012/0275977 | A1 | 11/2012 | Chandler et al. |
| 2012/0301378 | A1 | 11/2012 | Fedeyko et al. |
| 2013/0052125 | A1 | 2/2013 | Moini et al. |
| 2013/0090234 | A1 | 4/2013 | Yilmaz et al. |
| 2013/0136677 | A1 | 5/2013 | Chandler et al. |
| 2013/0195731 | A1 | 8/2013 | Bull et al. |
| 2013/0224082 | A1 | 8/2013 | Narula et al. |
| 2013/0334460 | A1 * | 12/2013 | Sauerbeck ............... B01J 29/84 252/194 |
| 2013/0336863 | A1 | 12/2013 | Soeger et al. |
| 2014/0072508 | A1 | 3/2014 | Sauerbeck et al. |
| 2015/0367337 | A1 | 12/2015 | Yang et al. |

FOREIGN PATENT DOCUMENTS

| | | | |
|---|---|---|---|
| WO | WO 2010/099650 | | 9/2010 |
| WO | WO 2010/099651 | | 9/2010 |
| WO | 2012085150 | * | 6/2012 |
| WO | WO 2012/085150 | | 6/2012 |
| WO | WO 2012/085157 | | 6/2012 |

OTHER PUBLICATIONS

Eilertsen, E., et al., "Synthesis of Titanium Chabazite: A New Shape Selective Oxidation Catalyst," *ChemCatChem*, 2011, pp. 1869-1871, vol. 3.

Sauerbeck, Silke, "A New Type of SCR Formulation With Broad Operation Range," Clariant, Stationary Emission Control/ Environmental Zeolites, Jun. 6, 2013, 18 pages.

Fickel, D. W., and Lobo, R. F., "Copper coordination in Cu-SSZ-13 and Cu-SSZ-16 investigated by variable-temperature XRD," Journal of Physical Chemistry C., 2010, pp. 1633-1640, vol. 114(3).

Kunitake, Y., et al. "Synthesis of titanated chabazite with enhanced thermal stability by hydrothermal conversion of titanated faujasite," Microporous and Mesoporous Materials, Oct. 2015, pp. 56-66, vol. 215.

* cited by examiner

ISOMORPHOUSLY SUBSTITUTED CATALYST

TECHNICAL FIELD

The present invention relates generally to the field of selective catalytic reduction catalysts and to methods of selectively reducing nitrogen oxides. More particularly, the invention relates to a catalyst comprising a zeolitic framework of silicon and aluminum atoms, wherein a fraction of the silicon atoms are isomorphously substituted with a tetravalent metal.

BACKGROUND

Over time, the harmful components of nitrogen oxides ($NO_x$) have led to atmospheric pollution. $NO_x$ is contained in exhausted gases such as from internal combustion engines (e.g., automobiles and trucks), from combustion installations (e.g., power stations heated by natural gas, oil, or coal), and from nitric acid production plants.

Various methods have been used in the treatment of $NO_x$-containing gas mixtures. One type of treatment involves catalytic reduction of nitrogen oxides. There are two processes: (1) a nonselective reduction process wherein carbon monoxide, hydrogen, or a lower hydrocarbon is used as a reducing agent, and (2) a selective reduction process wherein ammonia or ammonia precursor is used as a reducing agent. In the selective reduction process, a high degree of removal with nitrogen oxide can be obtained with a small amount of reducing agent.

The selective reduction process is referred to as a SCR process (Selective Catalytic Reduction). The SCR process uses catalytic reduction of nitrogen oxides with ammonia in the presence of atmospheric oxygen with the formation predominantly of nitrogen and steam:

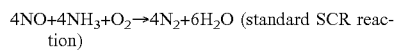
4NO+4NH$_3$+O$_2$→4N$_2$+6H$_2$O (standard SCR reaction)

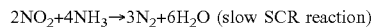
2NO$_2$+4NH$_3$→3N$_2$+6H$_2$O (slow SCR reaction)

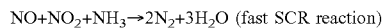
NO+NO$_2$+NH$_3$→2N$_2$+3H$_2$O (fast SCR reaction)

Catalysts employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

Molecular sieves such as zeolites have been used in the selective catalytic reduction (SCR) of nitrogen oxides with a reductant such as ammonia, urea, or a hydrocarbon in the presence of oxygen. Zeolites are crystalline materials having rather uniform pore sizes which, depending upon the type of zeolite and the type and amount of cations included in the zeolite lattice, range from about 3 to 10 Angstroms in diameter. Zeolites having 8-ring pore openings and double-six ring secondary building units, particularly those having cage-like structures have recently found interest in use as SCR catalysts. A specific type of zeolite having these properties is chabazite (CHA), which is a small pore zeolite with 8 member-ring pore openings (~3.8 Angstroms) accessible through its 3-dimensional porosity. A cage like structure results from the connection of double six-ring building units by 4 rings.

Metal-promoted zeolite catalysts including, among others, iron-promoted and copper-promoted zeolite catalysts, for the selective catalytic reduction of nitrogen oxides with ammonia are known. Iron-promoted zeolite beta has been an effective commercial catalyst for the selective reduction of nitrogen oxides with ammonia. Unfortunately, it has been found that under harsh hydrothermal conditions, for example exhibited during the regeneration of a soot filter with temperatures locally exceeding 700° C., the activity of many metal-promoted zeolites begins to decline. This decline is often attributed to dealumination of the zeolite and the consequent loss of metal-containing active centers within the zeolite.

Metal-promoted, particularly copper promoted aluminosilicate zeolites having the CHA structure type and a silica to alumina molar ratio greater than 1, particularly those having a silica to alumina ratio greater than or equal to 5, 10, or 15 and less than about 1000, 500, 250, 100 and 50 have recently solicited a high degree of interest as catalysts for the SCR of oxides of nitrogen in lean burning engines using nitrogenous reductants. This is because of the wide temperature window coupled with the excellent hydrothermal durability of these materials, as described in U.S. Pat. No. 7,601,662. Prior to the discovery of metal promoted zeolites described in U.S. Pat. No. 7,601,662, while the literature had indicated that a large number of metal-promoted zeolites had been proposed in the patent and scientific literature for use as SCR catalysts, each of the proposed materials suffered from one or both of the following defects: (1) poor conversion of oxides of nitrogen at low temperatures, for example 350° C. and lower; and (2) poor hydrothermal stability marked by a significant decline in catalytic activity in the conversion of oxides of nitrogen by SCR. Thus, the invention described in U.S. Pat. No. 7,601,662 addressed a compelling, unsolved need to provide a material that would provide conversion of oxides of nitrogen at low temperatures and retention of SCR catalytic activity after hydrothermal aging at temperatures in excess of 650° C.

Even though the catalysts described in U.S. Pat. No. 7,601,662, exhibit excellent properties, there is always a desire for improved performance in extended or different temperature windows. Thus, one of the challenges of meeting current governmental (for example, Euro 6) $NO_x$ regulations is the improvement of low temperature performance while maintaining the high temperature performance of the SCR catalyst. Accordingly, an SCR catalyst is needed that achieves a balanced performance for both low and high temperatures.

SUMMARY

A first embodiment pertains to SCR catalyst comprising a zeolitic framework material of silicon and aluminum atoms, wherein a fraction of the silicon atoms are isomorphously substituted with a tetravalent metal and the catalyst is promoted with a metal selected from Cu, Fe, Co, Ni, La, Ce, Mn, V, Ag, and combinations thereof.

In a second embodiment, the SCR catalyst of the first embodiment is modified, wherein the tetravalent metal comprises a tetravalent transition metal.

In a third embodiment, the SCR catalyst of the first and second embodiments is modified, wherein the tetravalent transition metal is selected from the group consisting of Ti, Zr, Hf, Ge, and combinations thereof.

In a fourth embodiment, the SCR catalyst of the first through third embodiments is modified, wherein the tetravalent transition metal comprises Ti.

In a fifth embodiment, the SCR catalyst of the first through fourth embodiments is modified, wherein the silica to alumina ratio is in the range of 1 to 300.

In a sixth embodiment, the SCR catalyst of the first through fifth embodiments is modified, wherein the silica to alumina ratio is in the range of 1 to 50.

In a seventh embodiment, the SCR catalyst of the first through sixth embodiments is modified, wherein the tetravalent metal to alumina ratio is in the range of 0.0001 to 1000.

In an eighth embodiment, the SCR catalyst of the first through seventh embodiments is modified, wherein the tetravalent metal to alumina ratio is in the range of 0.01 to 10.

In a ninth embodiment, the SCR catalyst of the first through eighth embodiments is modified, wherein the tetravalent metal to alumina ratio is in the range of 0.01 to 2.

In a tenth embodiment, the SCR catalyst of the first through ninth embodiments is modified, wherein the silica to tetravalent metal ratio is in the range of 1 to 100.

In an eleventh embodiment, the SCR catalyst of the first through a tenth embodiment is modified, wherein the silica to tetravalent metal ratio is in the range of 5 to 20.

In a twelfth embodiment, the SCR catalyst of the first through eleventh embodiments if modified, wherein the zeolitic framework material comprises ring sizes no larger than 12.

In a thirteenth embodiment, the SCR catalyst of the first through twelfth embodiments is modified, wherein the zeolitic framework material comprises a d6r unit.

In a fourteenth embodiment, the SCR catalyst of the first through thirteenth embodiments is modified, wherein the zeolitic framework material is selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof.

In a fifteenth embodiment, the SCR catalyst of the first through fourteenth embodiments is modified, wherein the zeolitic framework material is selected from AEI, CHA, AFX, ERI, KFI, LEV, and combinations thereof.

In a sixteenth embodiment, the SCR catalyst of the first through fifteenth embodiments is modified, wherein the zeolitic framework material is selected from AEI, CHA, and AFX.

In a seventeenth embodiment, the SCR catalyst of the first through sixteenth embodiments is modified, wherein the zeolitic framework material is CHA.

In an eighteenth embodiment, the SCR catalyst of the first through seventeenth embodiments is modified, wherein the catalyst is promoted with Cu, Fe, and combinations thereof.

In a nineteenth embodiment, the SCR catalyst of the first through eighteenth embodiments is modified, wherein the catalyst is effective to promote the formation of $NO^+$.

In a twentieth embodiment, the SCR catalyst of the first through nineteenth embodiments is modified with the proviso that the zeolitic framework excludes phosphorous atoms.

Embodiments of a second aspect of the invention are directed to a method for selectively reducing nitrogen oxides ($NO_x$). In a twenty first embodiment, the method for selectively reducing nitrogen oxides ($NO_x$) comprises contacting an exhaust gas stream containing $NO_x$ with a catalyst of the first through twentieth embodiments.

Embodiments of a third aspect of the invention are directed to an exhaust gas treatment system. In a twenty-second embodiment, an exhaust gas treatment system comprises an exhaust gas stream containing ammonia and a catalyst in accordance with the first through twentieth embodiments.

In a fourth aspect, a twenty-third embodiment is provided directed to use of the catalyst of any of the first through twentieth embodiments a catalyst for the selective catalytic reduction of $NO_x$ in the presence of ammonia.

DETAILED DESCRIPTION

Figure 1:
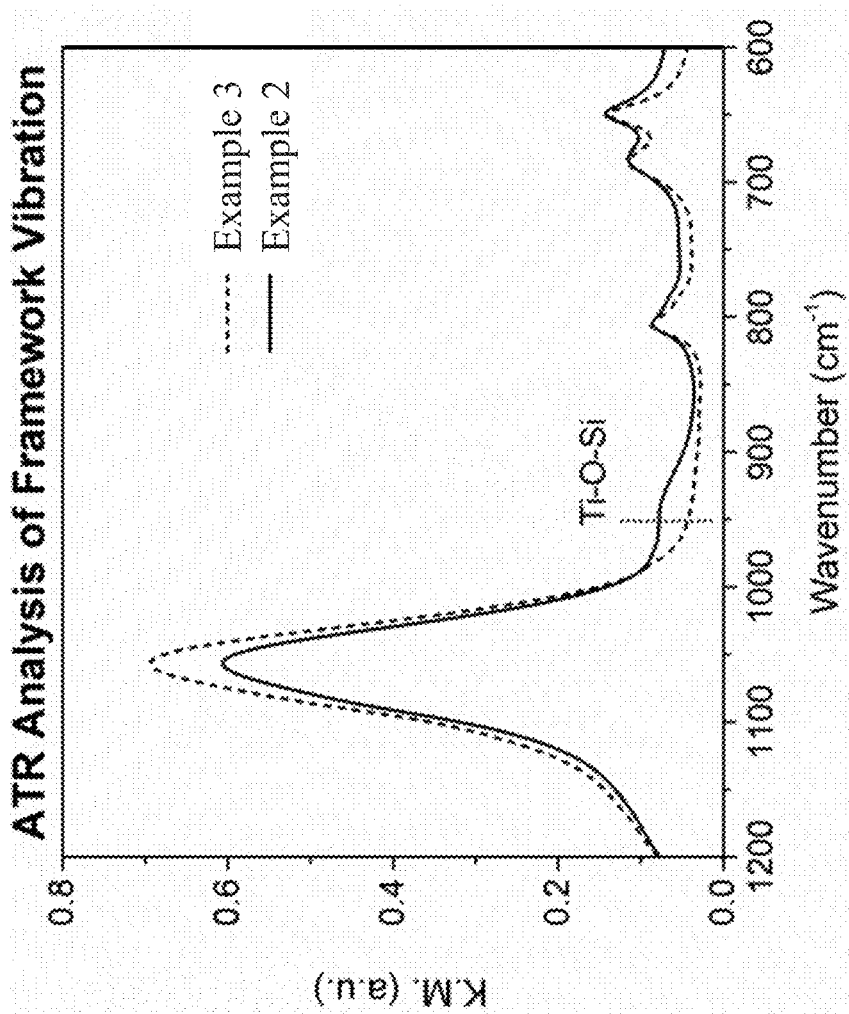
FIG. 1 is an ATR analysis for catalysts according to the Examples.

Before describing several exemplary embodiments of the invention, it is to be understood that the invention is not limited to the details of construction or process steps set forth in the following description. The invention is capable of other embodiments and of being practiced or being carried out in various ways.

Governmental regulations mandate the use of $NO_x$ reduction technologies for light and heavy-duty vehicles. Selective catalytic reduction (SCR) of $NO_x$ using urea is an effective and dominant emission control technology for $NO_x$ control. To meet governmental regulations, an SCR catalyst that has improved performance compared to the current Cu-SSZ-13 based benchmark technology is necessary. Provided is an SCR catalyst having improved high temperature performance while maintaining low temperature performance. The SCR catalyst effectively promotes the reaction of ammonia with nitrogen oxides to form nitrogen and $H_2O$ selectively over a temperature range of 150 to 650° C.

Embodiments of the invention are directed to catalysts comprising a zeolitic framework of silicon and aluminum atoms, wherein a fraction of the silicon atoms are isomorphously substituted with a tetravalent metal, methods for their preparation, catalytic articles, exhaust gas systems, and methods for abating pollutants from exhaust gases using the catalysts. In specific embodiments, the catalyst is promoted with a metal selected from Cu, Fe, Co, Ni, La, Ce, Mn, V, Ag, and combinations thereof. It was surprisingly found that the isomorphously substituted zeolitic framework materials are particularly suitable in exhaust gas purification catalyst components, in particular as SCR catalysts.

With respect to the terms used in this disclosure, the following definitions are provided.

As used herein, the term "catalyst" or "catalyst composition" or "catalyst material" refers to a material that promotes a reaction.

As used herein, the term "selective catalytic reduction" (SCR) refers to the catalytic process of reducing oxides of nitrogen to dinitrogen ($N_2$) using a nitrogenous reductant.

As used herein, the term "FTIR" refers to Fourier transform infrared spectroscopy, which is a technique used to obtain an infrared spectrum of absorption, emission, photoconductivity or Raman scattering of a solid, liquid, or gas.

As used herein, the term "ATR" refers to attenuated total reflectance, which is a sampling technique used in conjunction with infrared spectroscopy, particularly FTIR, which enables samples to be examined directly in the solid or liquid state without further preparation.

According to one or more embodiments, a SCR catalyst comprises a zeolitic framework that is isomorphously substituted with a tetravalent metal. The adsorbent zeolitic framework is used to adsorb gaseous pollutants, usually hydrocarbons, and retain them during the initial cold-start period. As the exhaust temperature increases, the adsorbed hydrocarbons are driven from the adsorbent and subjected to catalytic treatment at the higher temperature. As used herein, the term "molecular sieves", such as zeolites and other zeolitic framework materials, refer to materials, which may in particulate form support catalytic precious group metals. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the terms "zeolitic framework" and "zeolitic framework material" refer to a specific example of a molecular sieve, further including silicon and aluminum atoms.

Generally, zeolitic framework materials are defined as aluminosilicates with open 3-dimensional framework structures composed of corner-sharing $TO_4$ tetrahedra, where T is Al or Si. Cations that balance the charge of the anionic framework are loosely associated with the framework oxygens, and the remaining pore volume is filled with water molecules. The non-framework cations are generally exchangeable, and the water molecules removable.

According to embodiments of the invention, the catalyst comprises a zeolitic framework material of silicon (Si) and aluminum (Al) ions, wherein a fraction of the silicon atoms are isomorphously substituted with a tetravalent metal. In specific embodiments, the framework does not include phosphorous (P) atoms.

As used herein, the terms "isomorphously substituted" and "isomorphous substitution" refer to the substitution of one element for another in a mineral without a significant change in the crystal structure. Elements that can substitute for each other generally have similar ionic radii and valence state. In one or more embodiments, a fraction of the silicon atoms are isomorphously substituted with a tetravalent metal. In other words, a fraction of the silicon atoms in the zeolitic framework material are being replaced with a tetravalent metal. Such isomorophous substitution does not significantly alter the crystal structure of the zeolitic framework material.

As used herein, the term "tetravalent metal" refers to a metal having a state with four electrons available for covalent chemical bonding in its valence (outermost electron shell). Tetravalent metals include germanium (Ge) and those transition metals located in Group 4 of the periodic table, titanium (Ti), zirconium (Zr), and hafnium (Hf). In one or more embodiments, the tetravalent metal is selected from Ti, Zr, Hf, Ge, and combinations thereof. In specific embodiments, the tetravalent metal comprises Ti.

In one or more embodiments, the zeolitic framework material comprises $MO_4/SiO_4/AlO_4$ tetrahedra (where M is a tetravalent metal) and is linked by common oxygen atoms to form a three-dimensional network. The isomorphously substituted tetravalent metals are embedded into the zeolitic framework material as a tetrahedral atom ($MO_4$). The isomorphously substituted tetrahedron units together with the silicon and aluminum tetrahedron units then form the framework of the zeolitic material. In specific embodiments, the tetravalent metal comprises titanium, and the zeolitic framework material includes $TiO_4/SiO_4/AlO_4$ tetrahedra. Thus, in one or more embodiments, the catalyst comprises a zeolitic framework of silicon and aluminum atoms, wherein a fraction of the silicon atoms are isomorphously substituted with titanium.

The isomorphously substituted zeolitic framework material of one or more embodiments is differentiated mainly according to the geometry of the voids which are formed by the rigid network of the $MO_4/(SiO_4)/AlO_4$ tetrahedra (where M is a tetravalent metal). The entrances to the voids are formed from 6, 8, 10, or 12 ring atoms with respect to the atoms which form the entrance opening. In one or more embodiments, the zeolitic framework material comprises ring sizes of no larger than 12, including 6, 8, 10, and 12.

According to one or more embodiments, the classification of the zeolitic framework materials can be based on the framework topology by which the structures are identified. Typically, any structure type of zeolites/aluminosilicates can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In some embodiments, the zeolitic framework material can be a natural or synthetic zeolite such as faujasite, chabazite, clinoptilolite, mordenite, silicalite, zeolite X, zeolite Y, ultrastable zeolite Y, ZSM-5, ZSM-12, SSZ-3, SAPO 5, offretite, or a beta zeolite.

Zeolitic framework materials are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic framework structure types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

Without intending to be bound by theory, it is thought that the d6r unit promotes the formation of $NO^+$. In one or more embodiments, the zeolitic framework material comprises a d6r unit. In specific embodiments, the zeolitic framework material has a structure type selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof In other specific embodiments, the zeolitic framework material has a structure type selected from the group consisting of CHA, AEI, AFX, ERI, KFI, LEV, and combinations thereof. In very specific embodiments, the zeolitic framework material has a structure type selected from CHA, AEI, and AFX.

Isomorphous substitution of silicon with a tetravalent metal will affect the silica/alumina ratio of the zeolitic framework material. The ratio of silica to alumina of the molecular sieve component can vary over a wide range. In one or more embodiments, the first and second molecular sieve materials, independently, have a silica to alumina molar ratio (SAR) in the range of 2 to 300, including 5 to 250; 5 to 200; 5 to 100; and 5 to 50. In one or more specific embodiments, the first and second molecular sieve materials, independently, have a silica to alumina molar ratio (SAR) in the range of 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

The ratio of tetravalent metal to alumina can vary over a very wide range. It is noted that this ratio is an atomic ratio, not a molar ratio. In one or more embodiments, the tetravalent metal to alumina ratio is in the range of 0.0001 to 10000, including 0.0001 to 10000, 0.001 to 1000, and 0.01 to 10. In other embodiments, the tetravalent metal to alumina ratio is in the range of 0.01 to 10, including 0.01 to 10, 0.01: to 5, 0.01 to 2, and 0.01 to 1. In specific embodiments, the tetravalent metal to alumina ratio is in the range of 0.01 to 2.

In specific embodiments, the tetravalent metal comprises titanium, and the titania to alumina ratio is in the range of 0.0001 to 10000, including 0.0001 to 10000, 0.001 to 1000, and 0.01 to 10. In other embodiments, the titania to alumina ratio is in the range of 0.01 to 10, including 0.01 to 10, 0.01: to 5, 0.01 to 2, and 0.01 to 1. In specific embodiments, the titania to alumina ratio is in the range of 0.01 to 2.

The ratio of silica to tetravalent metal can vary over a wide range. It is noted that this ratio is an atomic ratio, not a molar ratio. In one or more embodiments, the silica to tetravalent metal ratio is in the range of 1 to 100, including 1 to 50, 1 to 30, 1 to 25, 1 to 20, 5 to 20, and 10 to 20. In specific embodiments, the silica to tetravalent metal ratio is about 15. In one or more embodiments, the tetravalent metal comprises titanium, and the silica to titania ratio is in the range of 1 to 100, including 1 to 50, 1 to 30, 1 to 25, 1 to 20, 5 to 20, and 10 to 20. In specific embodiments, the silica to titania ratio is about 15.

In one or more embodiments, the catalyst is a crystalline material. The synthesis of a zeolitic framework material varies according to the structure type of the zeolitic framework material, but usually, zeolitic framework materials are synthesized using a structure directing agent (SDA), sometimes referred to as a template (or organic template) together with sources of silica and alumina. The structure directing agent can be in the form of an organic, i.e. tetraethylammonium hydroxide (TEAOH), or inorganic cation, i.e. $Na^+$ or K. During crystallization, the tetrahedral units organize around the SDA to form the desired framework, and the SDA is often embedded within the pore structure of the zeolite crystals. In one or more embodiments, the crystallization of the isomorphously substituted zeolitic materials can be obtained by means of the addition of structure-directing agents/templates, crystal nuclei or elements.

As used herein, "promoted" refers to a component that is intentionally added to the molecular sieve, as opposed to impurities inherent in the molecular sieve. Thus, a promoter is intentionally added to enhance activity of a catalyst compared to a catalyst that does not have promoter intentionally added. In order to promote the SCR of oxides of nitrogen, in one or more embodiments, a suitable metal is exchanged into the isomorphously substituted zeolitic framework material. According to one or more embodiments, the catalyst is promoted with a metal selected from Cu, Fe, Co, Ni, La, Ce, Mn, and combinations thereof. In specific embodiments, the catalyst is promoted with Cu, Fe, and combinations thereof.

The promoter metal content of the catalyst, calculated as the oxide, is, in one or more embodiments, at least about 0.1 wt. %, reported on a volatile-free basis. In specific embodiments, the promoter metal comprises Cu, and the Cu content, calculated as CuO is in the range of up to about 10 wt. %, including 9, 8, 7, 6, 5, 4, 3, 2, and 1 wt. %, in each case based on the total weight of the calcined zeolitic framework material reported on a volatile free basis. In specific embodiments, the Cu content, calculated as CuO, is in the range of about 2 to about 5 wt. %.

Without intending to be bound by theory, it is thought that when the zeolitic framework material is isomorphously substituted with a tetravalent metal, the tetravalent metal is embedded into the zeolitic framework as a tetrahedral atom, allowing for close coupling to the active promoter metal center both structurally and electronically. In one or more embodiments, the promoter metal can be ion exchanged into the isomorphously substituted zeolitic framework material. In specific embodiments, copper is ion exchanged into the isomorphously substituted zeolitic framework material. The metal can be exchanged after the preparation or manufacture of the isomorphously substituted zeolitic framework material.

SCR Activity:

In one or more embodiments, the catalyst comprising a zeolitic framework material of silicon and aluminum atoms, wherein a fraction of the silicon atoms are isomorphously substituted with a tetravalent metal exhibits an aged $NO_x$ conversion at 200° C. of at least 50% measured at a gas hourly space velocity of 80000 $h^{-1}$. In specific embodiments the catalyst exhibits an aged $NO_x$ conversion at 450° C. of at least 70% measured at a gas hourly space velocity of 80000 $h^{-1}$. More specifically the aged $NO_x$ conversion at 200° C. is at least 55% and at 450° C. at least 75%, even more specifically the aged $NO_x$ conversion at 200° C. is at least 60% and at 450° C. at least 80%, measured at a gas hourly volume-based space velocity of 80000 $h^{-1}$ under steady state conditions at maximum $NH_3$-slip conditions in a gas mixture of 500 ppm NO, 500 ppm $NH_3$, 10% $O_2$, 5% $H_2O$, balance $N_2$. The cores were hydrothermally aged in a tube furnace in a gas flow containing 10% $H_2O$, 10% $O_2$, balance $N_2$ at a space velocity of 4,000 $h^{-1}$ for 5 h at 750° C.

The SCR activity measurement has been demonstrated in the literature, see, for example PCT Application Publication No. WO 2008/106519.

Furthermore, according to one or more embodiments, the catalyst is effective to promote the formation of $NO^+$.

Without intending to be bound by theory, it is thought that the d6r unit of the zeolitic framework material is an important factor in facilitating $NO^+$ formation due to the fact that the d6r unit promotes short-range promoter metal (e.g. Cu) migration/hopping between the two six-member ring minor planes to generate suitable vacant positions for $NO^+$, which requires a stabilizing coordination environment also provided by the d6r unit.

The Substrate

In one or more embodiments, the catalyst can be applied to a substrate as a washcoat. As used herein, the term "substrate" refers to the monolithic material onto which the catalyst is placed, typically in the form of a washcoat. A washcoat is formed by preparing a slurry containing a specified solids content (e.g., 30-90% by weight) of catalyst in a liquid vehicle, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

The ceramic substrate may be made of any suitable refractory material, e.g. cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like.

The substrates useful for the catalyst of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel.

Preparation of Catalyst:

Conventional Zeolite Synthesis of CHA-Type Molecular Sieves

A molecular sieve having the CHA structure may be prepared according to various techniques known in the art, for example U.S. Pat. No. 4,544,538 (Zones) and U.S. Pat. No. 6,709,644 (Zones), which are herein incorporated by reference in their entireties.

Optionally $NH_4$-Exchange to Form $NH_4$-Chabazite:

Optionally, the obtained alkali metal zeolite is $NH_4$-exchanged to form $NH_4$-Chabazite. The $NH_4$-ion exchange can be carried out according to various techniques known in the art, for example Bleken, F.; Bjorgen, M.; Palumbo, L.; Bordiga, S.; Svelle, S.; Lillerud, K.-P.; and Olsbye, U. Topics in Catalysis 52, (2009), 218-228.

Synthesis of Isomorphously Substituted Zeolites According to Embodiments of the Invention According to one or more embodiments, methods for the synthesis of selective catalytic reduction catalysts comprising an isomorphously substituted zeolitic framework material are provided. Particularly, the catalyst comprises a zeolitic framework material of silicon and aluminum atoms, wherein a fraction of the silicon atoms are isomorphously substituted with a tetravalent metal.

Generally, the sodium form of the isomorphously substituted zeolitic framework material can be prepared from a $0.03Al_2O_3:SiO_2:0.07TiO_2:0.06Na_2O:0.08ATMAOH: 2.33H_2O$ gel composition through autoclave hydrothermal synthesis. The product is recovered by filtration, and the template is removed by calcination. The final crystalline material can be characterized by x-ray diffraction studies.

The H-form can be prepared by calcination of the ammonia form, which is obtained through double $NH_4NO_3$ exchanges with the sodium form. The Ti level is unchanged/stable through the $NH_4NO_3$ exchange processes.

The copper promoted isomorphously substituted zeolitic framework can be prepared by ion exchange using the H-form and $Cu(OAc)_2$ to achieve the desired amount of promoter metal.

Porosity and Particle Shape and Size

The isomorphously substituted zeolite framework material according to embodiments of the invention may be provided as a washcoat. The isomorphously substituted zeolitic framework material provides a washcoat that is generally very porous. The particle size of the isomorphously substituted zeolitic framework material is generally in the range of 1 to 2 μm. As is apparent to one of ordinary skill in the art, the particles of the isomorphously substituted zeolitic framework material are significantly larger than molecular sieves having the CHA structure prepared according to conventional methods known in the art. Such conventionally prepared molecular sieves are known to have a particle size less than about 0.5 μm.

The isomorphously substituted zeolitic framework according to embodiments of the invention may be provided in the form of a powder or a sprayed material from separation techniques including decantation, filtration, centrifugation, or spraying.

In general, the powder or sprayed material can be shaped without any other compounds, e.g. by suitable compacting, to obtain moldings of a desired geometry, e.g. tablets, cylinders, spheres, or the like.

By way of example, the powder or sprayed material is admixed with or coated by suitable modifiers well known in the art. By way of example, modifiers such as silica, alumina, zeolites or refractory binders (for example a zirconium precursor) may be used. The powder or the sprayed material, optionally after admixing or coating by suitable modifiers, may be formed into a slurry, for example with water, which is deposited upon a suitable refractory carrier (for example WO 2008/106519).

The isomorphously substituted zeolitic framework according to embodiments of the invention may also be provided in the form of extrudates, pellets, tablets or particles of any other suitable shape, for use as a packed bed of particulate catalyst, or as shaped pieces such as plates, saddles, tubes, or the like.

Method of Reducing NO$_x$ and Exhaust Gas Treatment System:

In general, the zeolitic framework material that is described above can be used as a molecular sieve, adsorbent, catalyst, catalyst support, or binder thereof. In one or more embodiments, the material is used as a catalyst.

Moreover, a second aspect of the invention is directed to a method of catalyzing a chemical reaction wherein the zeolitic framework material that is isomorphously substituted with a tetravalent metal according to embodiments of the invention is employed as catalytically active material.

Among others, said catalyst may be employed as catalyst for the selective reduction (SCR) of nitrogen oxides (NO$_x$) for the oxidation of NH$_3$, in particular for the oxidation of NH$_3$ slip in diesel systems; For applications in oxidation reactions, in specific embodiments an additional precious metal component is added to the zeolitic framework material that is isomorphously substituted with a tetravalent metal (e.g. Pd, Pt).

A second aspect of the invention is directed to one or more embodiments which include a method of selectively reducing nitrogen oxides (NO$_x$) or use of the catalyst described above. In one or more embodiments, the method or use of the catalyst comprises contacting an exhaust gas stream containing NO$_x$ with the catalyst of one or more embodiments. In particular, a method for the selective reduction of nitrogen oxides is provided wherein the selective catalytic reduction catalyst comprises use of a zeolitic framework of silicon and aluminum atoms, wherein a fraction of the silicon atoms are isomorphously substituted with a tetravalent metal of the invention is employed as catalytically active material is carried out in the presence of ammonia or urea.

While ammonia is the reducing agent of choice for stationary power plants, urea is the reducing agent of choice for mobile SCR systems. Typically, the SCR system is integrated in the exhaust gas treatment system of a vehicle and, also typically, contains the following main components: selective catalytic reduction catalyst comprising a zeolitic framework of silicon and aluminum atoms, wherein a fraction of the silicon atoms are isomorphously substituted with a tetravalent metal according to embodiments of the invention and an injector to inject a reductant such as ammonia or an ammonia precursor (e.g. urea) located upstream from the SCR catalyst. In specific embodiments, the system can include a reductant storage tank; a reductant pump; a reductant dosing system; a reductant injector/nozzle; and a respective control unit to control injection of the reductant. In specific embodiments, the catalyst comprises a zeolitic framework of silicon and aluminum atoms, wherein a fraction of the silicon atoms are isomorphously substituted with titanium.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

The term nitrogen oxides, NO$_x$, as used in the context of embodiments of the invention designates the oxides of nitrogen, especially dinitrogen oxide (N$_2$O), nitrogen monoxide (NO), dinitrogen trioxide (N$_2$O$_3$), nitrogen dioxide (NO$_2$), dinitrogen tetroxide (N$_2$O$_4$), dinitrogen pentoxide (N$_2$O$_5$), nitrogen peroxide (NO$_3$).

A third aspect of the invention is directed to an exhaust gas treatment system. In one or more embodiments, the exhaust gas treatment system comprises an exhaust gas stream optionally containing a reductant like ammonia, urea and/or hydrocarbon, and in specific embodiments, ammonia and/or urea, and a selective catalytic reduction catalyst comprising a zeolitic framework material of silicon and aluminum atoms, wherein a fraction of the silicon atoms are isomorphously substituted with a tetravalent metal. The catalyst is effective for destroying at least a portion of the ammonia in the exhaust gas stream.

In one or more embodiments, the catalyst can be disposed on a substrate, for example a soot filter. The soot filter, catalyzed or non-catalyzed, may be upstream or downstream of the catalyst. In one or more embodiments, the system can further comprise a diesel oxidation catalyst. In specific embodiments, the diesel oxidation catalyst is located upstream of the catalyst. In other specific embodiments, the diesel oxidation catalyst and the catalyzed soot filter are upstream from the catalyst.

In specific embodiments, the exhaust is conveyed from the engine to a position downstream in the exhaust system, and in more specific embodiments, containing NO$_x$, where a reductant is added and the exhaust stream with the added reductant is conveyed to the catalyst.

For example, a catalyzed soot filter, a diesel oxidation catalyst, and a reductant are described in WO 2008/106519, which is herein incorporated by reference. In specific embodiments, the soot filter comprises a wall-flow filter substrate, where the channels are alternately blocked, allowing a gaseous stream entering the channels from one direction (inlet direction), to flow through the channel walls and exit from the channels from the other direction (outlet direction).

An ammonia oxidation catalyst may be provided downstream of the catalyst to remove any slipped ammonia from the system. In specific embodiments, the AMOX catalyst may comprise a platinum group metal such as platinum, palladium, rhodium, or combinations thereof.

Such AMOX catalysts are useful in exhaust gas treatment systems including an SCR catalyst. As discussed in commonly assigned U.S. Pat. No. 5,516,497, the entire content of which is incorporated herein by reference, a gaseous stream containing oxygen, nitrogen oxides, and ammonia can be sequentially passed through first and second catalysts, the first catalyst favoring reduction of nitrogen oxides and the second catalyst favoring the oxidation or other decomposition of excess ammonia. As described in U.S. Pat. No. 5,516,497, the first catalysts can be a SCR catalyst comprising a zeolite and the second catalyst can be an AMOX catalyst comprising a zeolite.

AMOX and/or SCR catalyst composition(s) can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1

An isomorphously substituted zeolitic material (Na—[Ti]CHA) was prepared from an $0.03Al_2O_3:SiO_2:0.07TiO_2:0.06Na_2O:0.08ATMAOH:2.33H_2O$ gel composition through autoclave hydrothermal synthesis at 155° C. for 5 days. The product was recovered by filtration, and the template was removed by calcination at 600° C. for 5 hours. The final crystalline material had an x-ray powder diffraction pattern indicating >90% CHA phase and a silica/alumina ration (SAR) of 25 by XRF.

Example 2

An isomorphously substituted zeolitic material (H—[Ti]CHA) was prepared by 500° C. calcination (4 hrs.) of $NH_4$—[Ti]CHA, which was obtained through double $NH_4NO_3$ (2.4 M) exchanges with the material of Example 1 (Na—[Ti]CHA). The Ti level is unchanged through the $NH_4NO_3$ exchange processes, 4.3% vs. 4.5%.

Example 3—Comparative

The zeolitic material H—CHA was prepared according to the process of Example 1 (H—[Ti]CHA), but without Ti addition to the synthesis gel.

Example 4

A copper promoted isomorphously substituted zeolitic material (Cu2.72-[Ti]CHA) was prepared by ion exchange at 50° C. (2 hrs.) using the material of Example 2 (H—[Ti]CHA) and $Cu(OAc)_2$ (0.06 M), showing a Cu content of 2.72% (ICP).

Example 5

A copper promoted isomorphously substituted zeolitic material (Cu3.64-[Ti]CHA) was prepared by ion exchange at 50° C. (2 hrs.) using the material of Example 3 (H—[Ti]CHA) and $Cu(OAc)_2$ (0.125 M), showing a Cu content of 3.64% (ICP)

Example 6—Comparative

A standard copper promoted zeolitic material (Cu2.75-CHA) was prepared according to the process provided in U.S. Pat. No. 8,404,203B2, with comparable Cu content (2.75%) to Example 3. This material is provided as the reference for benchmarking.

Example 7—Comparative

A standard copper promoted zeolitic material (Cu3.84-CHA) was prepared according to the process provided in U.S. Pat. No. 8,404,203B2, with comparable Cu content (3.84%) to Example 4. This material is provided as the reference for aging benchmarking.

Example 8

The incorporation of Ti at the tetrahedral position is evidenced by fingerprints of Ti involved framework stretches (Ti—O—Si) at 940-980 $cm^{-1}$, as illustrated in FIG. 1.

Example 9

Figure 2:
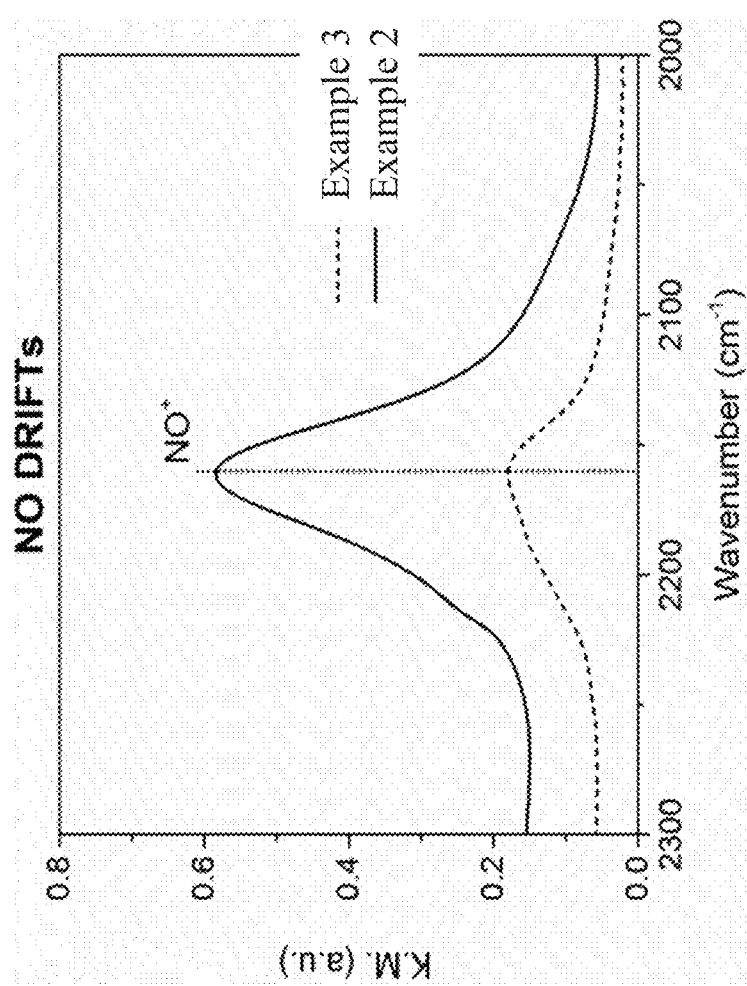
FIG. 2 is a FTIR analysis for catalysts according to the Examples.

In addition to the fingerprint vibrations from Ti involved framework stretches, the enhanced acidity of framework due to the high valence framework Ti(IV) is also evidenced from the increased intensity of $NO^+$, whose formation requires strong Lewis acidity, as illustrated in FIG. 2.

Example 10

Figure 3:
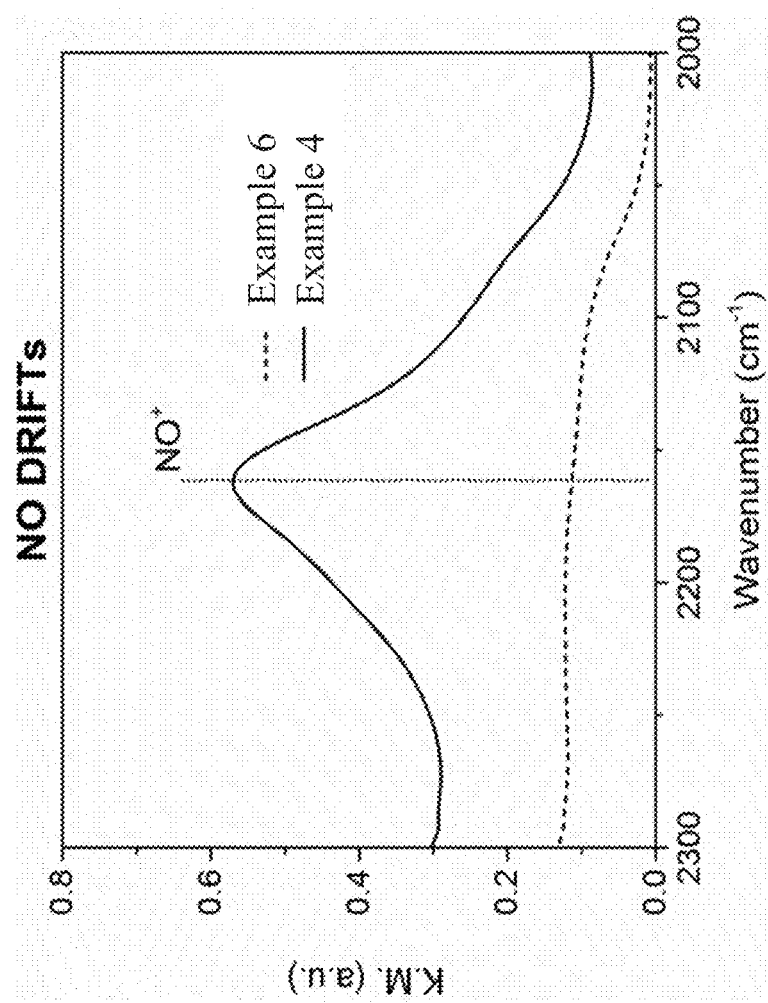
FIG. 3 is a FTIR analysis for catalysts according to the Examples.

After Cu was exchanged to acid sites of the isomorphously substituted zeolitic material [Ti]CHA providing the compounds of Examples 4 and 5, the formation of $NO^+$ is not affected. As illustrated in FIG. 3, the material of Example 4 (Cu2.72-[Ti]CHA) shows superior capability of generating more $NO^+$ compared to the unmodified Comparative Example 6 (Cu2.75-CHA) at an equilibrium state. Given the nature of high reactivity of $NO^+$ towards nucleophiles, e.g., $NH_3$, it is established that the observed significant reactivity boost at low temperatures (e.g., 200° C.) from Example 4 (Cu—[Ti]CHA) is due to the improved generation and retention of $NO^+$ over the catalyst.

Example 11

Figure 4:
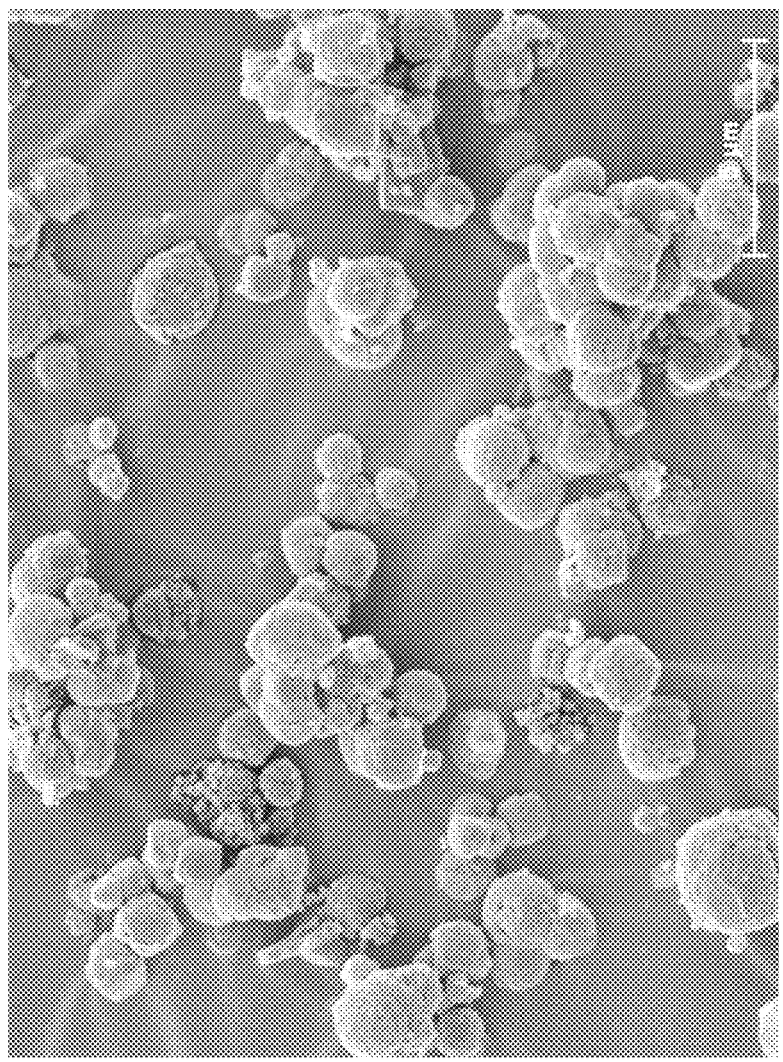
FIG. 4 is a x-ray crystal structure of material according to the Examples.

As can been observed in the x-ray crystal structures in FIG. 4, the as-synthesized [Ti]CHA (Example 2) has a characteristic secondary structure as spheres with a diameter size of 1-2 μm, as identified by SEM analysis (secondary electron imaging) at a scale of 5000×.

Example 12

The material of Example 4 (Cu—[Ti]CHA) was washcoated on a flow-through ceramic substrate at a loading of 2.1 $g/in^3$. The typical SCR testing condition includes simulated diesel exhaust gas (500 ppm NO, 500 ppm $NH_3$, 10% $O_2$, 5% $H_2O$, and balance $N_2$) and temperature points from 200° C. to 600° C. Conversion of NO and $NH_3$ at various temperatures are monitored by FTIR. An aging condition of 750° C. exposure to 10% $H_2O$ for 5 hrs. is adopted if desired to evaluate long term hydrothermal durability.

Figure 7A:
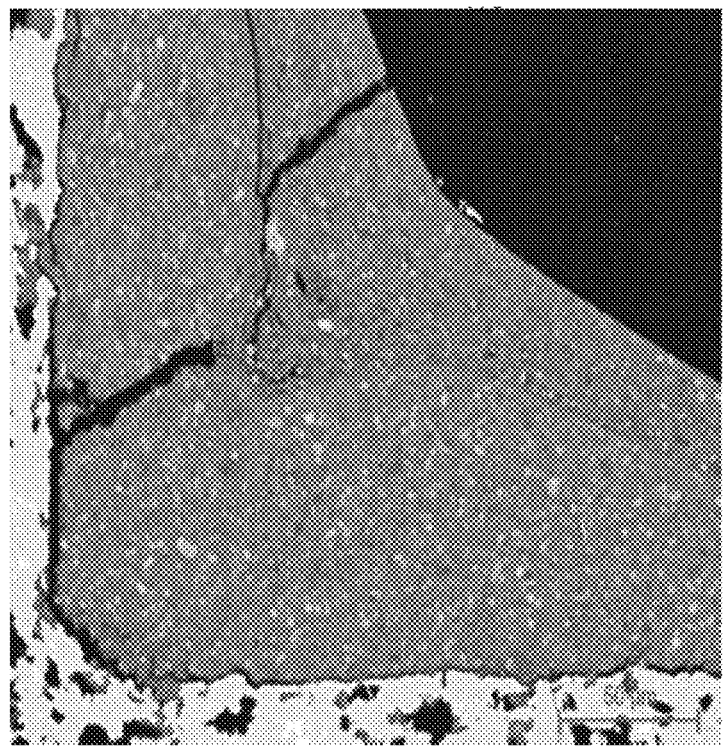
FIGS. 7A and 7B are x-ray crystal structures of materials according to the Examples.
Figure 7B:
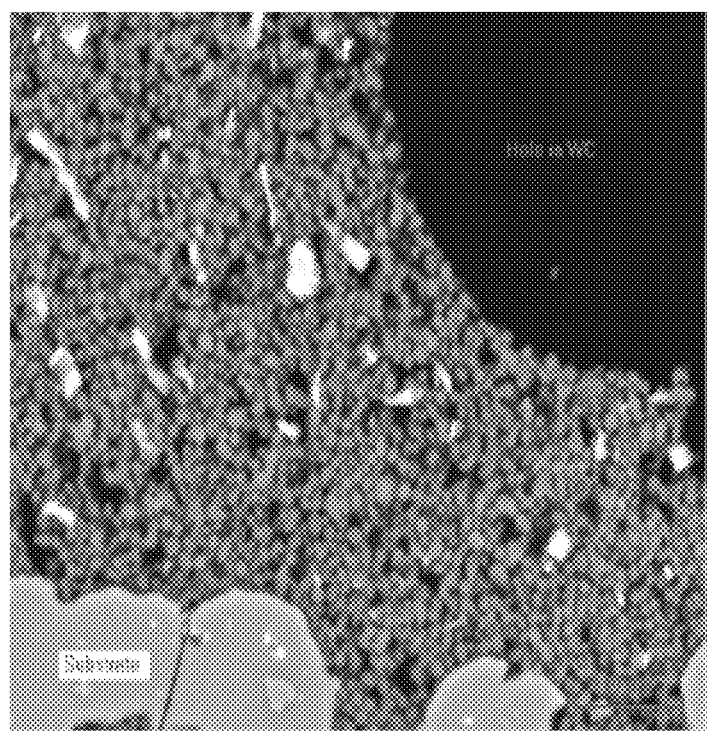

As illustrated in the x-ray crystal structures in FIGS. 7A and 7B, the as-synthesized Cu—[Ti]CHA produces a washcoat that is very porous (FIG. 7B) when compared to a standard copper promoted zeolitic material, Cu—CHA.

Example 13

Figure 8:
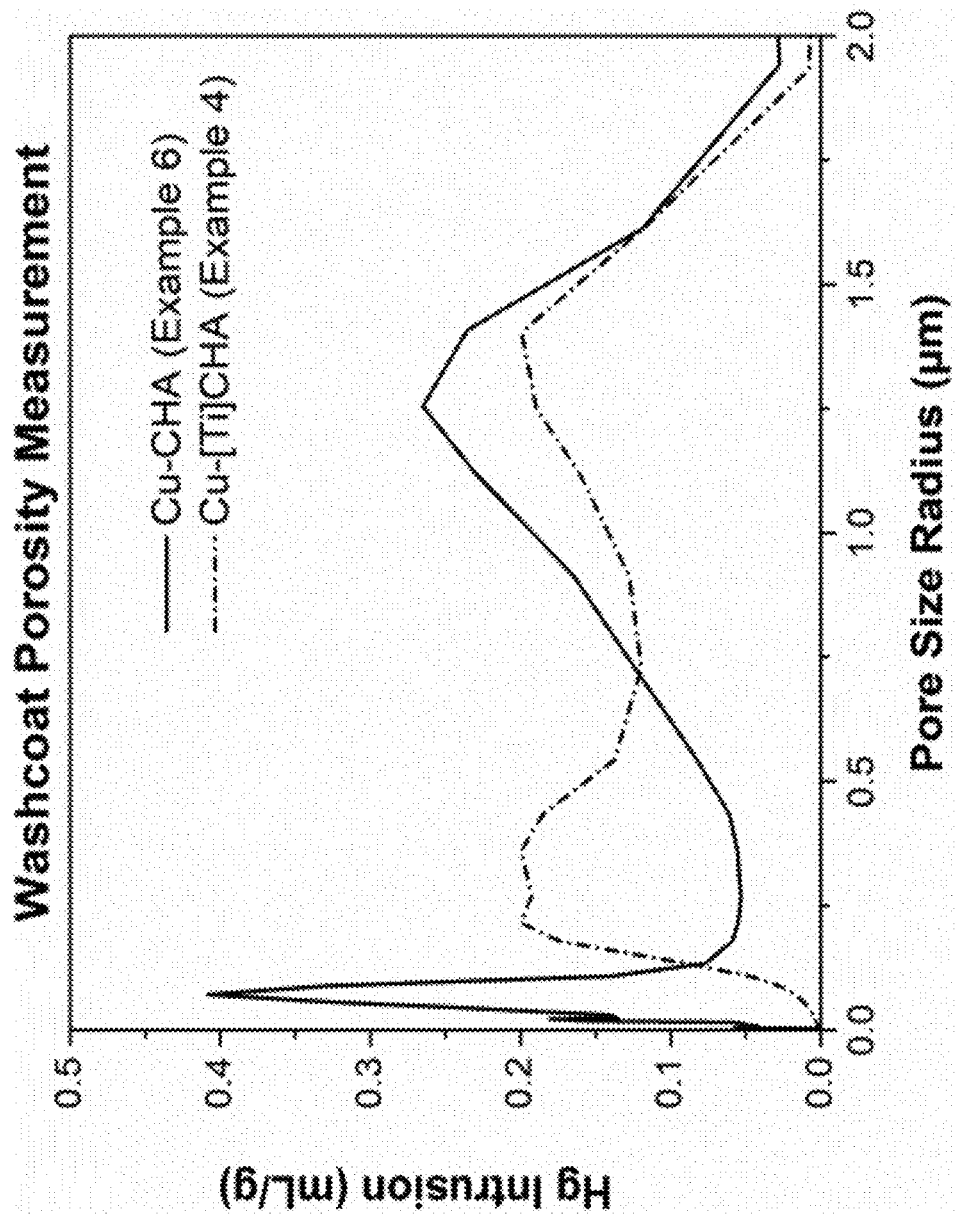
FIG. 8 is a washcoat porosity measurement for catalysts according to the Examples.

The porosity and particle size of the materials is presented in FIG. 8. As illustrated in FIG. 8, shown by Hg intrusion measurement, the washcoat formed from Cu—[Ti]CHA (Example 4) has a porosity distribution more towards larger pores compared to unmodified Cu—CHA (Example 6).

In addition to the increased porosity of the washcoat, the as-synthesized Cu—[Ti]CHA produces particle sizes that are significantly larger than the particle size of a standard copper promoted zeolitic material.

Example 14

Catalyst Cu—[Ti]CHA has been washcoated on a flow-through ceramic substrate at a loading of 2.1 $g/in^3$. A typical SCR testing condition includes simulated diesel exhaust gas (500 ppm NO, 500 ppm $NH_3$, 10% $O_2$, 5% $H_2O$, and balance $N_2$) and temperature points from 200° C. to 600° C. Conversion of NO and $NH_3$ at various temperatures are monitored by FTIR. An aging condition of 750° C. exposure to 10% $H_2O$ for 5 hrs. is adopted if desired to evaluate long term hydrothermal durability.

Figure 5:
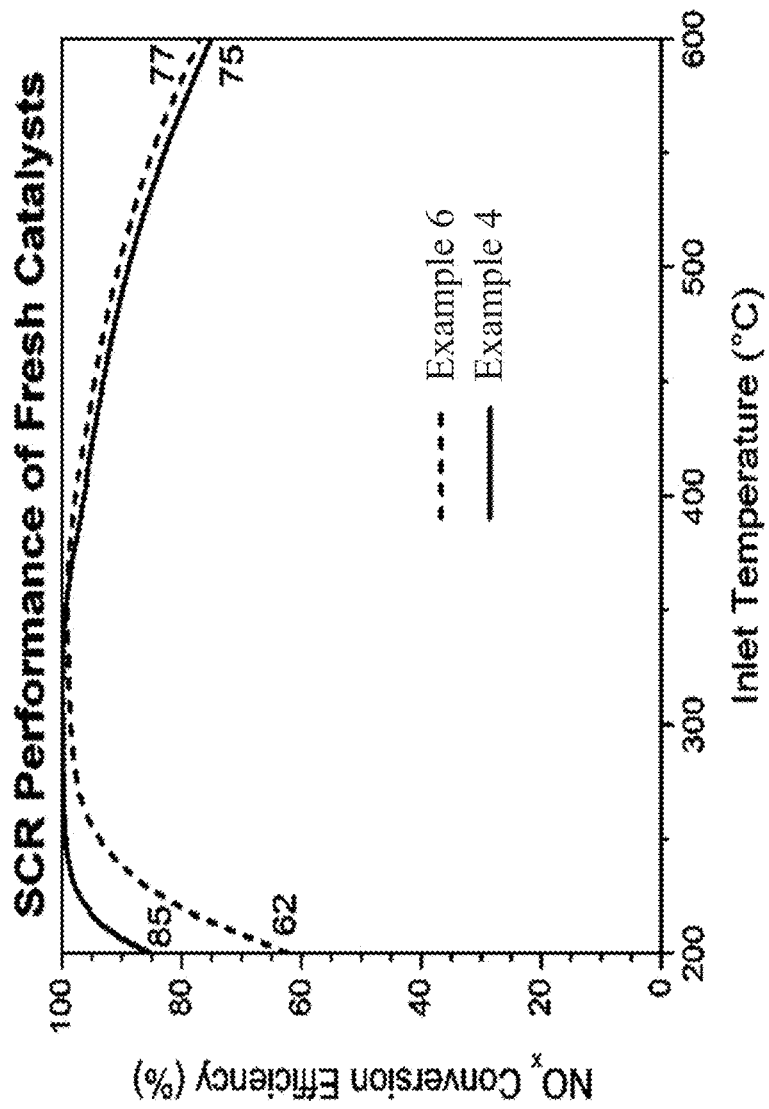
FIG. 5 compares $NO_x$ conversion for catalysts according to the Examples.

As illustrated in FIG. 5, with the assistance of framework Ti (Example 4), the SCR performance at 200° C. is significantly improved compared to the analogous sample without Ti (Example 6) at comparable Cu %, and no sacrifice of the high temperature (600° C.) $NO_x$ conversion efficiency is observed.

Example 15

Figure 6:
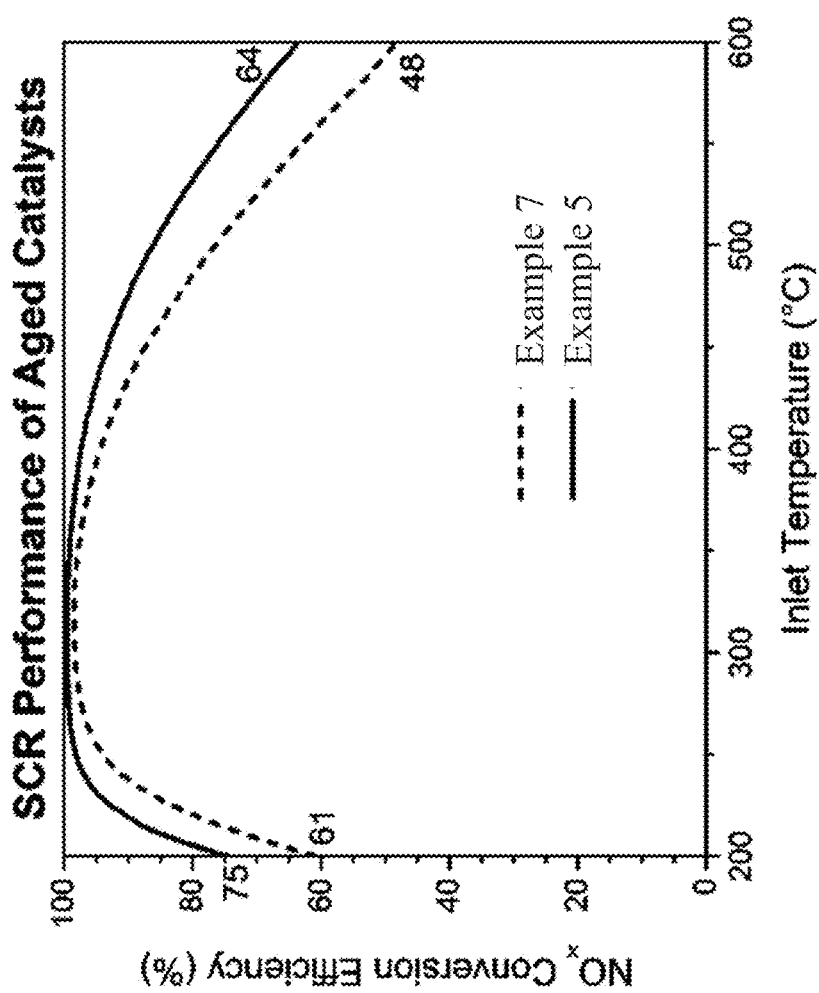
FIG. 6 compares $NO_x$ conversion for catalysts according to the Examples.

As illustrated in FIG. 6, high Cu content (e.g., Cu %>2.5% @ SAR=30), after high temperature hydrothermal aging, results in the formation of CuO, which actively consumes $NH_3$ leading to a decreased SCR performance at the high temperature end. The presence of framework Ti (Example 5) helps to alleviate the $NH_3$ consumption at the high temperature region with high Cu loaded sample.

Example 16

An isomorphously substituted zeolitic material (Na—[Ti]AEI) is analogously to the material of Example 1. The product is recovered by filtration, and the template is removed by calcination at 600° C. for 5 hours.

Example 17

An isomorphously substituted zeolitic material (H—[Ti]AEI) is prepared by 500° C. calcination (4 hrs.) of $NH_4$—[Ti]AEI, which is obtained through double $NH_4NO_3$ (2.4 M) exchanges with the material of Example 15 (Na—[Ti]AEI).

Example 18

A copper promoted isomorphously substituted zeolitic material (Cu—[Ti]AEI) is prepared by ion exchange at 50° C. (2 hrs.) using the material of Example 16 (H—[Ti]AEI) and $Cu(OAc)_2$ (0.06 M).

Example 19

An isomorphously substituted zeolitic material (Na—[Ti]AFX) is analogously to the material of Example 1. The product is recovered by filtration, and the template is removed by calcination at 600° C. for 5 hours.

Example 20

An isomorphously substituted zeolitic material (H—[Ti]AFX) is prepared by 500° C. calcination (4 hrs.) of $NH_4$—[Ti]AFX, which is obtained through double $NH_4NO_3$ (2.4 M) exchanges with the material of Example 18 (Na—[Ti]AFX).

Example 21

A copper promoted isomorphously substituted zeolitic material (Cu—[Ti]AFX) is prepared by ion exchange at 50° C. (2 hrs.) using the material of Example 19 (H—[Ti]AFX) and $Cu(OAc)_2$ (0.06 M).

All references, including publications, patent applications, and patents, cited herein are hereby incorporated by reference for all purposes to the same extent as if each reference were individually and specifically indicated to be incorporated by reference and were set forth in its entirety herein.

The use of the terms "a" and "an" and "the" and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. An SCR catalyst comprising a zeolite with a framework material of silicon and aluminum atoms, wherein a fraction of the silicon atoms are isomorphously substituted with Ti; wherein the zeolitic framework material has a zeolitic frameworlds selected from CHA, AFX, and AEI; and wherein the catalyst zeolite is promoted with Cu, Fe, or a combination thereof by ion-exchange into the zeolite.

2. The catalyst of claim 1, having a silica to alumina ratio in the range of 1 to 300.

3. The catalyst of claim 2, wherein the silica to alumina ratio is in the range of 1 to 50.

4. The catalyst of claim 1, having a Ti to alumina ratio in the range of 0.0001 to 1000.

5. The catalyst of claim 4, wherein the Ti to alumina ratio is in the range of 0.01 to 10.

6. The catalyst of claim 5, wherein the Ti to alumina ratio is in the range of 0.01 to 2.

7. The catalyst of claim 1, having a silica to Ti ratio in the range of 1 to 100.

8. The catalyst of claim 7, wherein the silica to Ti ratio is in the range of 5 to 20.

9. The catalyst of claim 1, wherein the framework is CHA.

10. The catalyst of claim 1, wherein the zeolite is promoted with Cu.

11. The catalyst of claim 1, wherein the catalyst is effective to promote the formation of $NO^+$.

12. The catalyst of claim 1, wherein the framework is AFX.

13. The catalyst of claim 1, wherein the framework is AEI.

14. A method for selectively reducing nitrogen oxides (NOx), the method comprising contacting an exhaust gas stream containing NOx with a catalyst in accordance with claim 1.

15. An exhaust gas treatment system comprising an exhaust gas stream containing ammonia and a catalyst in accordance with claim 1 effective for destroying at least a portion of the ammonia in the exhaust gas stream.

16. A catalyst article comprising a substrate having a catalytic coating disposed thereon, wherein the catalytic coating comprises a catalyst in accordance with claim 1.

17. The catalyst article of claim 16, wherein the substrate is ceramic or metal having a honeycomb structure.

* * * * *

UNITED STATES PATENT AND TRADEMARK OFFICE
CERTIFICATE OF CORRECTION

PATENT NO. : 9,889,437 B2  
APPLICATION NO. : 14/687097  
DATED : February 13, 2018  
INVENTOR(S) : Xiaofan Yang and John K. Hochmuth Page 1 of 1

It is certified that error appears in the above-identified patent and that said Letters Patent is hereby corrected as shown below:

In the Claims

In Column 16, Line(s) 56 - 57, Claim 1, after "wherein the zeolitic framework material has a zeolitic" delete "frame worlds" and insert --framework--, therefor.

Signed and Sealed this  
Second Day of October, 2018

Andrei Iancu  
*Director of the United States Patent and Trademark Office*